United States Patent [19]

Peters et al.

[11] Patent Number: 5,042,445
[45] Date of Patent: Aug. 27, 1991

[54] ELECTRONIC CONTROLLED FUEL SUPPLY SYSTEM FOR HIGH PRESSURE INJECTOR

[75] Inventors: Lester L. Peters; Julius P. Perr, both of Columbus; Edward D. Smith, Greensburg, all of Ind.

[73] Assignee: Cummins Engine Company, Inc., Columbus, Ind.

[21] Appl. No.: 572,212

[22] Filed: Aug. 24, 1990

Related U.S. Application Data

[62] Division of Ser. No. 248,194, Sep. 23, 1988, Pat. No. 4,971,016.

[51] Int. Cl.$^5$ .............................................. F02M 7/00
[52] U.S. Cl. .............................. 123/446; 123/198 DB; 123/500; 239/88
[58] Field of Search ............... 123/446, 447, 467, 500, 123/501, 502, 198 DB; 239/88–96, 533.1–533.12

[56] References Cited

U.S. PATENT DOCUMENTS

| | | | |
|---|---|---|---|
| 3,802,626 | 4/1974 | Regineaugt | 239/533.5 |
| 3,951,117 | 4/1976 | Perr | 123/500 |
| 4,129,254 | 12/1978 | Bader | 239/96 |
| 4,235,374 | 11/1980 | Walter | 123/500 |
| 4,249,499 | 2/1981 | Perr | 123/500 |
| 4,279,385 | 7/1981 | Straubel | 239/88 |
| 4,378,775 | 4/1983 | Straubel et al. | 125/501 |
| 4,385,609 | 5/1983 | Kato | 123/446 |
| 4,425,894 | 1/1984 | Kato et al. | 123/500 |
| 4,450,783 | 5/1984 | Morris et al. | 123/458 |
| 4,463,725 | 8/1984 | Lauffr | 123/446 |
| 4,463,901 | 8/1984 | Perr et al. | 239/95 |
| 4,471,740 | 9/1984 | Jourde | 123/446 |
| 4,485,787 | 12/1984 | Kato | 123/446 |
| 4,489,886 | 12/1984 | Kato | 239/88 |
| 4,503,825 | 3/1985 | Schneider | 123/501 |
| 4,621,605 | 11/1986 | Carey, Jr. et al. | 123/446 |
| 4,721,247 | 1/1988 | Perr | 239/91 |
| 4,951,631 | 8/1990 | Eckert | 123/501 |

Primary Examiner—Carl S. Miller
Attorney, Agent, or Firm—Sixbey, Friedman, Leedom & Ferguson

[57] ABSTRACT

An electronically controlled fuel supply system is provided for employing a plurality of fuel injectors which maximize SAC pressures under both low speed and high speed operating conditions and are capable of sustaining SAC pressures in excess of 30,000 psi. The fuel supply system of the present invention includes a gear pump which supplies pressure-modulated fuel to a fueling channel and to a timing channel and from there to a plurality of injectors. Fuel pressure regulator means and timing fluid pressure regulator means are provided in the fueling and timing channel, respectively. An electronic control unit receives information relating to engine operating conditions from a plurality of sensors and actuates the fuel pressure regulator means and the timing fluid pressure regulator means to adjust the pressure as required for the specific engine operating conditions. The timing fluid is delivered to the injectors by the present system at a pressure sufficient to sustain a hydraulic link within the injector of the length necessary to maintain high SAC pressures during injection. Several embodiments of a fuel supply system which achieves these objectives are disclosed. A mounting integral with the cylinder head for an electronically controlled injector fuel supply system is also provided.

13 Claims, 9 Drawing Sheets

FIG. 3. PREDICTED RAIL PRESSURE FOR INJ. QTY. SUPERCHARGER ON 8 DEG. SOI

ELECTRONIC CONTROLLED FUEL SUPPLY SYSTEM FOR HIGH PRESSURE INJECTOR

This is a divisional application of Ser. No. 07/248,194, filed Sep. 23, 1988, now U.S. Pat. No. 4,971,016.

TECHNICAL FIELD

The present invention relates generally to fuel supply systems for supplying fuel to the fuel injectors on an internal combustion engine and particularly to an electronically controlled fuel supply system capable of meeting the fuel supply requirements of high pressure fuel injectors.

BACKGROUND ART

In the quest for high efficiency emissions-free internal combustion engines, engine manufacturers have attempted to develop engine fuel supply systems that achieve complete fuel combustion. While this goal has thus far proved somewhat illusory, significant improvements in both combustion efficiency and emissions reduction have occurred. Simple, reliable engine fuel systems of reasonable cost which will achieve the aforesaid goals are still being sought, however.

A major purpose in seeking complete fuel combustion is to reduce polluting engine emissions, especially in the levels of hydrocarbons, nitrogen oxides and particulate materials. Fuel injectors, in particular, have been designed purporting to achieve efficiency of combustion, fuel economy and emissions abatement. Injectors such as those described in U.S. Pat. Nos. 3,951,117, 4,463,901, and 4,621,605, assigned to the same assignee as the present invention, have proven to be effective, reliable and economical. However, the achievement of proposed further restrictions on levels of hydrocarbons, nitrogen oxides and particulates in vehicle emissions could present problems, even with injectors such as these. The cost effectiveness and fuel economy associated with currently available fuel injectors is likely to be sacrificed, especially if after treatments such as catalysts are required to achieve acceptable levels of these pollutants. Not only can after treatments be costly, they also can present substantial maintenance problems.

Therefore, dealing with pollutants at the source—in the combustion space—presents a simpler, more efficient, cost effective solution. This means increasing the efficiency of the combustion process which, in turn, requires the injection of fuel at high pressures, considerably higher pressures than have heretofore been attained, particularly during low speed engine operation. The injection pressure capabilities of previously available fuel injectors has been limited to SAC pressures (pressure of the fuel in the injection chamber just in front of the injector spray holes) to under 20,000 psi.

In order for each of the engine injectors to be able to sustain SAC pressures substantially above 20,000 psi, however, the engine fuel supply system must be able to provide precisely controlled amounts of fuel and timing fluid to each injector at the precise time required in the injection cycle. The fuel supply systems described in U.S. Pat. Nos. 3,951,117; 4,463,901 and 4,621,605 are designed to supply fuel and timing fluid to injectors in which SAC pressures are limited to less than 20,000 psi, even under high speed engine operating conditions. While these fuel supply systems adequately meet the needs of such fuel injectors, they are not sufficiently responsive to engine operating conditions to supply the needs of very high pressure injectors. Moreover, these fuel supply systems are not designed to cooperate with fuel injectors that must pressurize the fuel to a substantial level in the low speed operating range without increasing the injection pressure more than necessary in the high speed operation range. Further, they are not sufficiently sensitive to the wide range of engine operating parameters required for the efficient operation of high pressure injectors, nor do they provide the degree of precise independent control of timing pressures needed.

Many of the fuel supply systems currently available, moreover, are made up of components such as pumps, pressure regulators and fuel lines that are mounted externally of the engine head thereby increasing the risk of fuel leakage, and further complicating maintenance and other problems associated with fuel plumbing external to the engine head.

Consequently, there is a need for a fuel supply system capable of responding precisely to a wide range of engine operating parameters to provide the precise supply of both fuel and timing fluid to each engine fuel injector required to enable each injector to achieve SAC pressures in excess of 30,000 psi during injection. There is a further need for such a fuel supply system including components that may be integrally mounted with the engine cylinder head in locations that will enhance the efficient operation of these components.

DISCLOSURE OF THE INVENTION

It is a primary object of the present invention, therefore, to overcome the disadvantages of the prior art and to provide a fuel supply system capable of the precision of response to engine operating conditions required to supply the precise amounts of fuel and timing fluid to the engine fuel injectors while also achieving SAC pressures in excess of 30,000 psi.

It is another object of the present invention to provide a fuel supply system for fuel injectors capable of achieving high SAC pressures that is electronically controlled.

It is yet another object of the present invention to provide an electronically controlled fuel supply system for high SAC pressure fuel injectors that supplies the precise quantity of fuel and timing fluid required to achieve pressurization of the fuel in the injector to a substantial level in low speed operating ranges without undesirably elevating injection pressures in the high speed operating ranges.

It is a further object of the present invention to provide an electronically controlled fuel supply system for use with open nozzle type high pressure fuel injectors wherein the components of the system are integrally mounted with the engine head to supply fuel and timing fluid to a plurality of such injectors associated with a common fuel rail and a common timing fluid rail located internally of the engine head.

It is a still further object of the present invention to provide an electronically controlled fuel supply system responsive to throttle position and other engine operating parameters to control the pressure of the timing fluid by an electronically actuated pressure controller.

It is still another object of the present invention to provide an electronically controlled fuel supply system for high pressure fuel injectors wherein the quantity of timing fluid metered into each injector is electronically controlled in response to pressure (P-metered) or pressure-time (P/T-metered) or a combination of both pressure and pressure-time considerations.

In accordance with the aforesaid objects, an electronically controlled fuel supply system capable of meeting the fuel and timing fluid supply requirements for fuel injectors that achieve pressures in the injection chamber in excess of 30,000 psi is provided. The system includes completely independent fueling and timing channels, each of which is connected to a plurality of high pressure injectors. Control of the quantity of fuel to be injected is achieved through the fueling channel in accordance with pressure-time (PT) principles. Control of the quantity of fuel metered into the injector timing chamber is achieved through the injection timing channel according to pressure (P) principles, pressure-time (PT) principles, or both. Electronic control means responsive to throttle position and various engine operating parameters monitors the pressure of both the fuel in the fueling channel and the fuel in the injection timing channel and actuates pressure control means to adjust the fuel pressure and the timing fluid pressure as required to achieve the desired quantity and the correct timing of injection for the condition of the engine. The present invention additionally provides several embodiments of control means for achieving efficient control of the timing fluid pressure so that a hydraulic link of a length needed to control the timing of injection of fuel at SAC pressure in excess of 30,000 psi is produced in the injectors. A mounting arrangement wherein the various components of the present system may be mounted in separate locations integrally with the engine cylinder head is also provided.

Further objects and advantages will be apparent to one skilled in the art from the following description, claims and drawings.

BEST MODE FOR CARRYING OUT THE INVENTION

High pressure fuel injectors of the type described in U.S. Pat. No. 4,721,247, assigned to the same assignee as the present invention, require careful and precise metering of both the fuel and the timing fluid supplied to the injector to achieve the efficiency of combustion and resultant excellent emissions abatement characteristic of these injectors. The fuel demands of the high pressure injector are similar to those of any other PT-metered injector. That is, the amount of fuel actually metered is a function of the supply pressure and the total metering time the fuel flows into the injector. Control of the timing fluid, however, must not only be completely independent from the control of the fueling, but must also be infinitely variable to achieve the variable timing which is necessary to take advantage of the high SAC pressures produced by this kind of high pressure injector. The present invention proposes several embodiments of fuel and timing fluid control means to be employed in an electronically controlled fuel system for the high pressure injector described herein.

Figure 1:
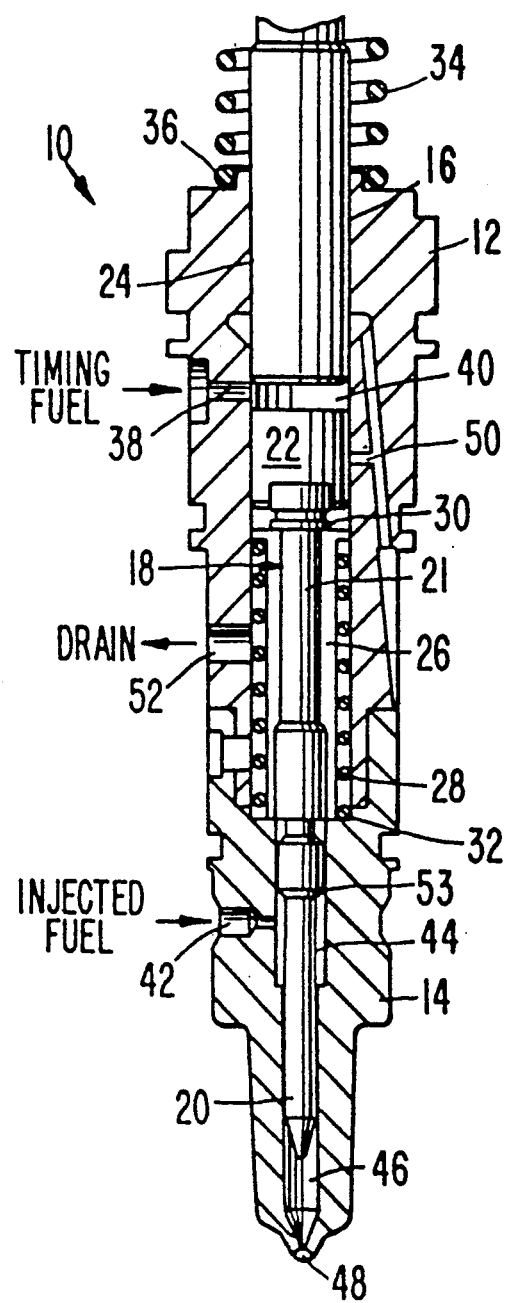
FIG. 1 is a schematic cross-sectional view of a high pressure fuel injector.

Referring to the drawings, FIG. 1 illustrates one type of high pressure fuel injector the present fuel supply system is intended to supply. This and other similar high pressure fuel injectors are described in commonly owned U.S. Pat. No. 4,721,247, the disclosure of which is hereby incorporated by reference. The fuel injector 10 of FIG. 1 is of the open nozzle type and typically reaches SAC pressures in excess of 35,000 psi during engine operation. Fuel injector 10 is received, in a conventional manner, in the head of an internal combustion engine (not shown).

The body of the fuel injector 10 is formed of two sections, an injector barrel 12 and a one-piece injector cup 14. Extending axially through the fuel injector is a bore 16 within which is disposed a reciprocating plunger assembly 18. The reciprocating plunger assembly 18 is comprised of three serially arranged plungers: an injection plunger 20, and intermediate plunger 22, and an upper plunger 24. A compensating chamber 26 is formed below the intermediate plunger 22 and includes disposed therein a coil spring 28 which receives the upper end 21 of injection plunger 20 and engages an actuating member 30 located at the upper end 21 of plunger 20. The lower end of spring 28 rests upon a seat 32 formed in the injector cup 14 so that the force of the spring 28 exerted on the actuator 30 will draw the injection plunger upwardly into engagement with the intermediate plunger 22 to force the three plunger elements together from completion of an injection cycle up until metering and timing has started for the next injection cycle.

The upper end of a plunger return spring 34 engages the uppermost end (not shown) of upper plunger 24, while the lower end of return spring 34 is seated against the top 36 of the injector barrel 12. Return spring 34 biases the upper plunger 24 upwardly to engage a cam operated actuator (not shown) to uncover a timing fluid fill passage 38, thereby allowing the timing fluid to enter passage 38 as indicated with sufficient pressure to separate the intermediate plunger 22 from the upper plunger 24 as shown at 40 by compressing the spring 28. The extent of the separation between the upper plunger 24 and the intermediate plunger 22 is determined by the equilibrium between the spring force 28 and the force produced by the pressure of the timing fluid acting on the area of intermediate plunger 22. The greater the separation between plungers 22 and 24, the greater the advance of injection timing.

Simultaneously with the flow of timing fluid into passage 38, fuel for injection is metered through a fuel supply passage 42 into the injector cup 14. Fuel then flows into a fuel channel 44 located in the injector cup circumferentially about lower plunger 20 and into an injection chamber 46. The injection orifices (not individually illustrated) are located at the lowermost end of chamber 46 is nozzle 48. During the metering of injection fuel, the injection chamber 46 will be partially filled with a precisely metered quantity of fuel in accordance with the known "pressure/time" (PT) principle, wherein the amount of fuel actually metered is a function of the fuel supply pressure and the total metering time that fuel flows through the orifice in fuel passage 42 into the injector. This orifice (not shown) in passage 42 has carefully controlled hydraulic characteristics which achieve the desired pressure/time fuel metering capability. The position of the plunger assembly 18 in FIG. 1 is shown in the position it occupies during the metering of both the fueling and timing portion of the injection cycle.

During injection, the upper plunger 24 is driven downward by a cam (not shown), which forces timing fluid out of space 40 and through passage 38 until the plunger 24 blocks passage 38. Timing fluid is trapped in the space 40 between the upper plunger 24 and the intermediate plunger 22, thus forming a hydraulic link which causes all three plungers to move in unison toward the nozzle 48. The movement of the lower plunger 20 into fuel-containing injection chamber 46 will result in the pressurization of this fuel once the plunger 20 has moved far enough into chamber 46 to fill that part of the chamber not otherwise filled with fuel. The distance point from the end of nozzle 48 to where injection is started is termed the "solid fuel height" and determines the point in the plunger's travel when injection actually begins. The solid fuel height in a high pressure injector is achieved when the plunger edge 53 is at a point significantly below the fuel passage 42, which enables high SAC pressures to be achieved.

The three plunger assembly 18 of the fuel injector of FIG. 1 transmits force for the injection of the fuel from the upper plunger 24 through the hydraulic link at 40 to the intermediate plunger 22 and finally to lower plunger 20 so that, in effect, the force of the plunger assembly acting upon the timing fluid is co-equal to that acting upon the fuel to be injected. However, because the lower plunger 20 has a significantly smaller diameter than the intermediate and upper plungers (22, 24), the pressure to which the timing fluid is subjected can be much lower and, therefore, more easily sustained than the pressure to which the fuel in chamber 46 is subjected. The large diameter of plunger 22 associated with a lower timing fluid pressure also permits a large return spring and thus a large return force to be applied.

At the end of injection the hydraulic link at 40 is collapsed, and timing fluid is forced out of the injector through a drain passage 50. When all of the timing fluid has been drained, upper plunger 24 and intermediate plunger 22 are no longer separated, but are in mechanical contact. During this stage in the injection cycle, any fuel entering passage 42 will be directed out of the injector through drain 52.

In order to achieve precise control over the timing of injection, thus assuring the efficiency of combustion timing fluid having a variable pressure is supplied for establishing a hydraulic link of a length as required to vary the time at which the plunger assembly reaches the solid fuel height. Consequently, precise control of the pressure of the timing fluid supplied to the injector through passage 38 is required. Since the timing fluid typically used in fuel injectors is fuel, the present invention provides a timing fluid supply system for high pressure injectors which is an integral part of, yet is controlled independently from, the injector fuel supply.

Figure 2:
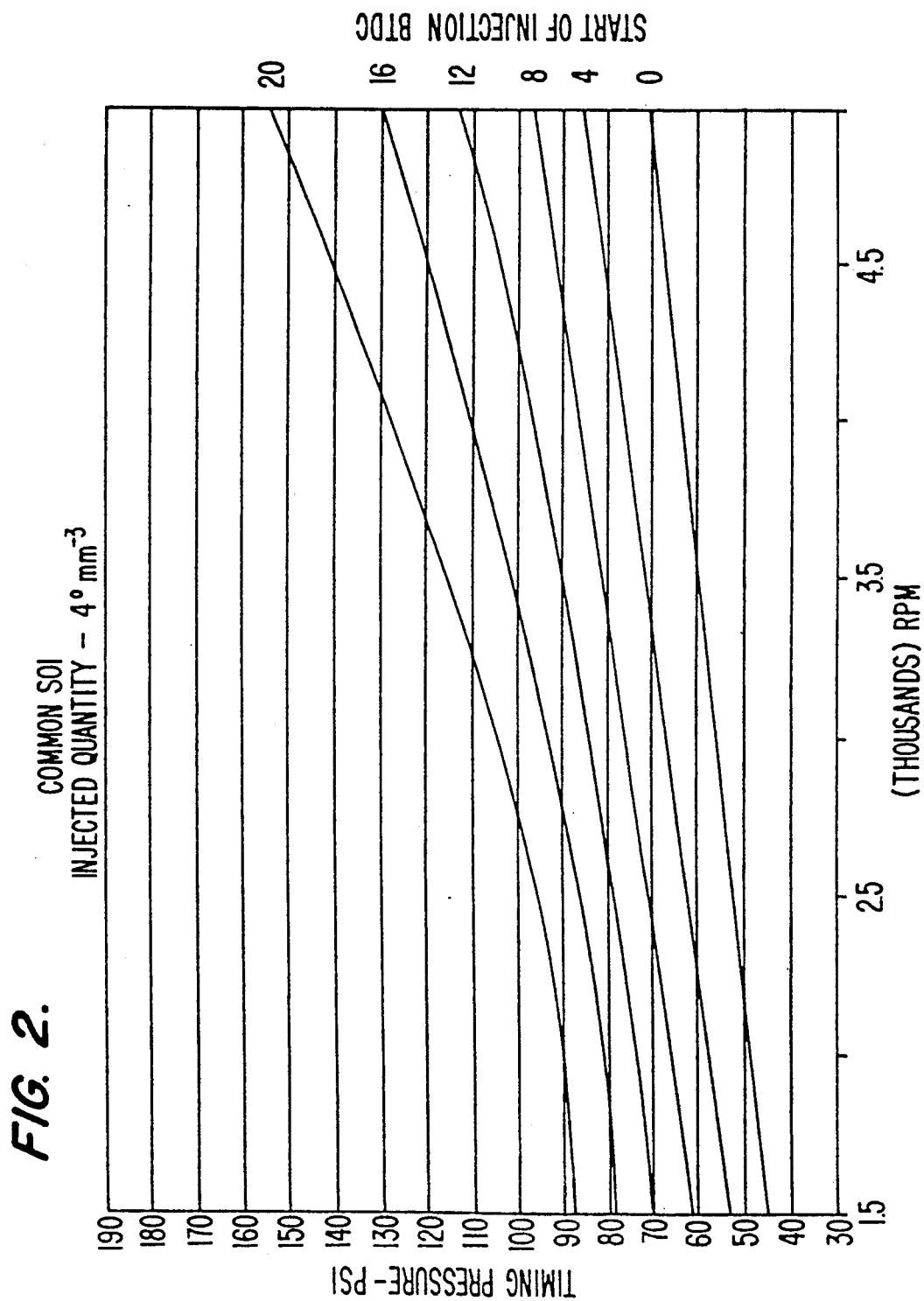
FIG. 2 is a graphic representation of the timing pressure requirements for the fuel injector of FIG. 1, wherein the timing fluid is P-metered at low speeds and PT-metered at higher speeds.
Figure 3:
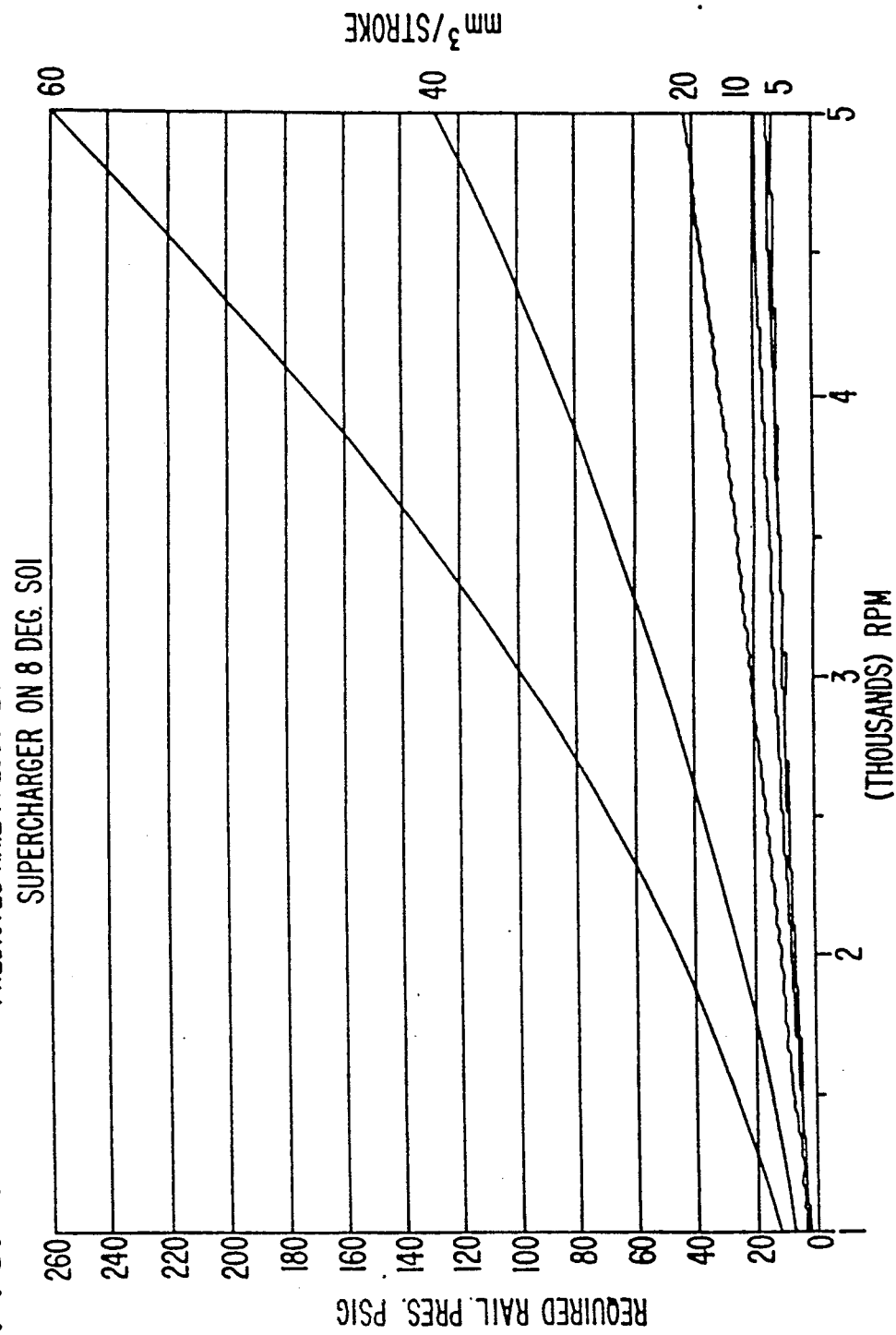
FIG. 3 is a graphic representation of the fueling pressure requirements of the fuel injector of FIG. 1 at different engine speeds.

The electronically controlled fuel supply system of the present invention, therefore, includes a dual channel fuel supply, one channel provides fuel for injection to the injector through passage 42, and the other channel provides fuel to the injector through passage 38 to be used as timing fluid. The fueling channel controls the quantity of fuel to be injected in accordance with PT (pressure/time) metering through an orifice in passage 42 in the injector. FIG. 2 illustrates, in graphic form, the pressure requirements for a high pressure injector which is P-metered at low speeds and PT-metered at higher speeds for various injected quantities of fuel. FIG. 3 illustrates, in graphic form, typical pressure requirements for a range of injected fuel quantities at engine speeds from 1000 to 5000 rpm.

Figure 4:
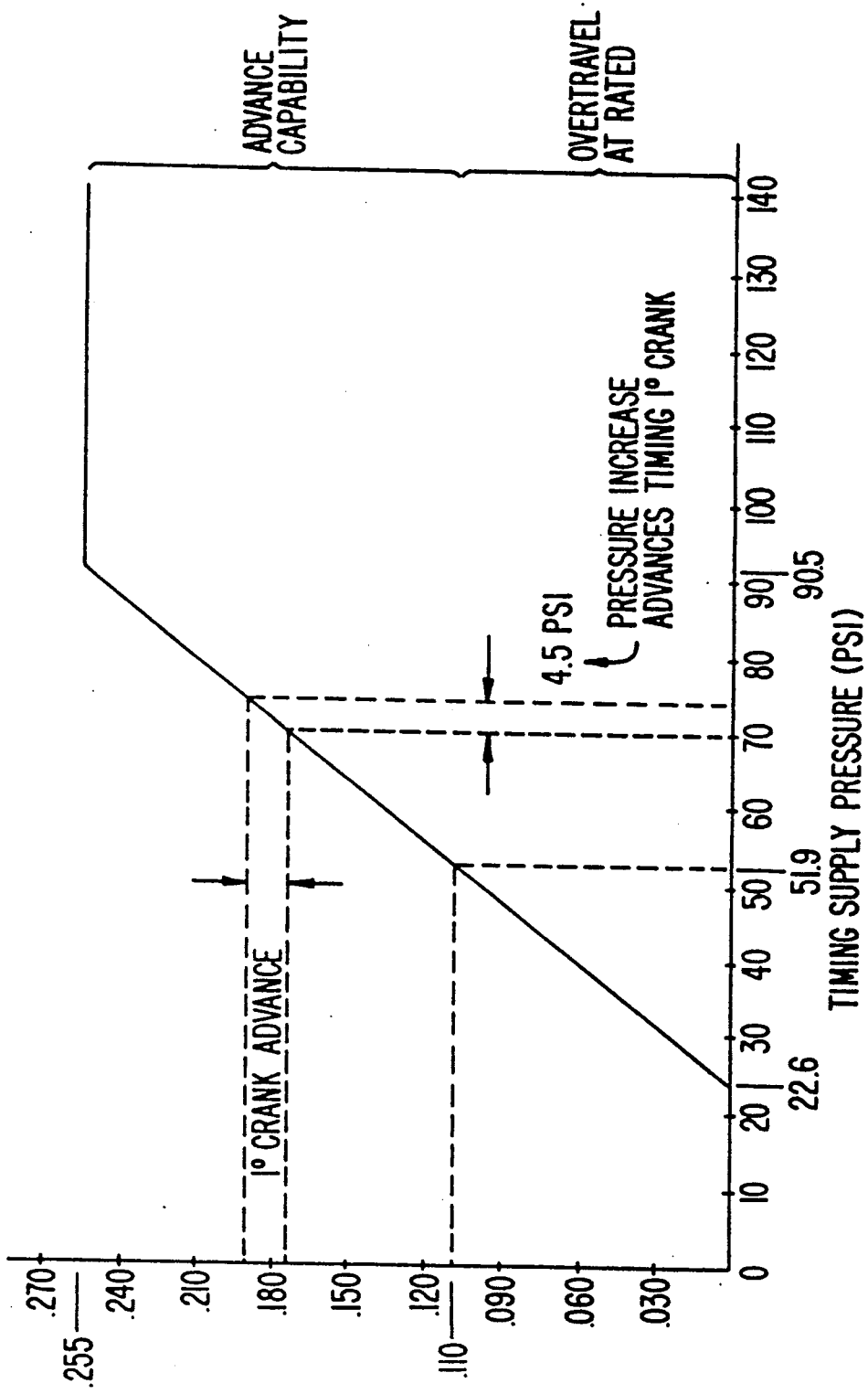
FIG. 4 is a graphic representation of the timing pressure requirements of the fuel injector of FIG. 1, wherein the timing fluid is P-metered at all speeds.

The injection timing channel controls the quantity of fuel metered into the timing passage 38 of the injector to create the hydraulic link at 40 (FIG. 1). The length of the hydraulic link may be controlled by the pressure acting against the spring 28, in which case it is P-metered. Alternatively, the length of the hydraulic link at 40 may be PT-metered and controlled by the size of the orifice in passage 38 and the length of time during which timing fluid is allowed to be metered into the timing fluid chamber, or the length of the hydraulic link may be both P-metered and PT-metered. FIG. 4 illustrates, in graphic form, the timing supply pressures required to produce plunger separations and, therefore, hydraulic links of various lengths for an engine that is P-metered at all speeds.

FIGS. 5–9 illustrate, in schematic form, different embodiments of electronically controlled fuel supply systems that may be employed in conjunction with the high pressure injector of FIG. 1. Each of these proposed fuel supply systems will supply fuel and timing fluid in the amounts and at the pressures required to establish a variable length hydraulic link sufficient to advance timing in a manner consistent with engine conditions. Although the present fuel supply system is described primarily with reference to a single high pressure fuel injector, the system is intended to meet the fuel and timing fluid supply requirements of a plurality of such fuel injectors, the exact number of fuel injectors being dependent on the particular engine.

The electronic controls for the injector fuel and timing fluid supply system described herein may be provided by an electronic control unit as described below in connection with the several embodiments of the present invention. An electronic control unit suitable for this purpose will preferably include some type of microprocessor (not shown) capable of receiving electrical control inputs from, for example, pressure transducers. Additional control inputs can be provided by other transducers, such as throttle transducers, by sensors, such as a magnetic speed sensor, and the like. Appropriate connections must be provided between the sources of control input and the microprocessor. The control input information is processed by the microprocessor and signals responsive to this information are generated by the microprocessor to actuate the various pressure controlling components of the present system. Since the objective to be achieved herein is the precise control of the pressure of both fuel and timing fluid supplied to the injector, control inputs from a large number of engine operating conditions are directed to a microprocessor. The microprocessor then processes this information and transmits signals to actuate pressure regulating means to adjust the pressure of fuel and timing fluid in accordance with the control inputs.

Figure 5:
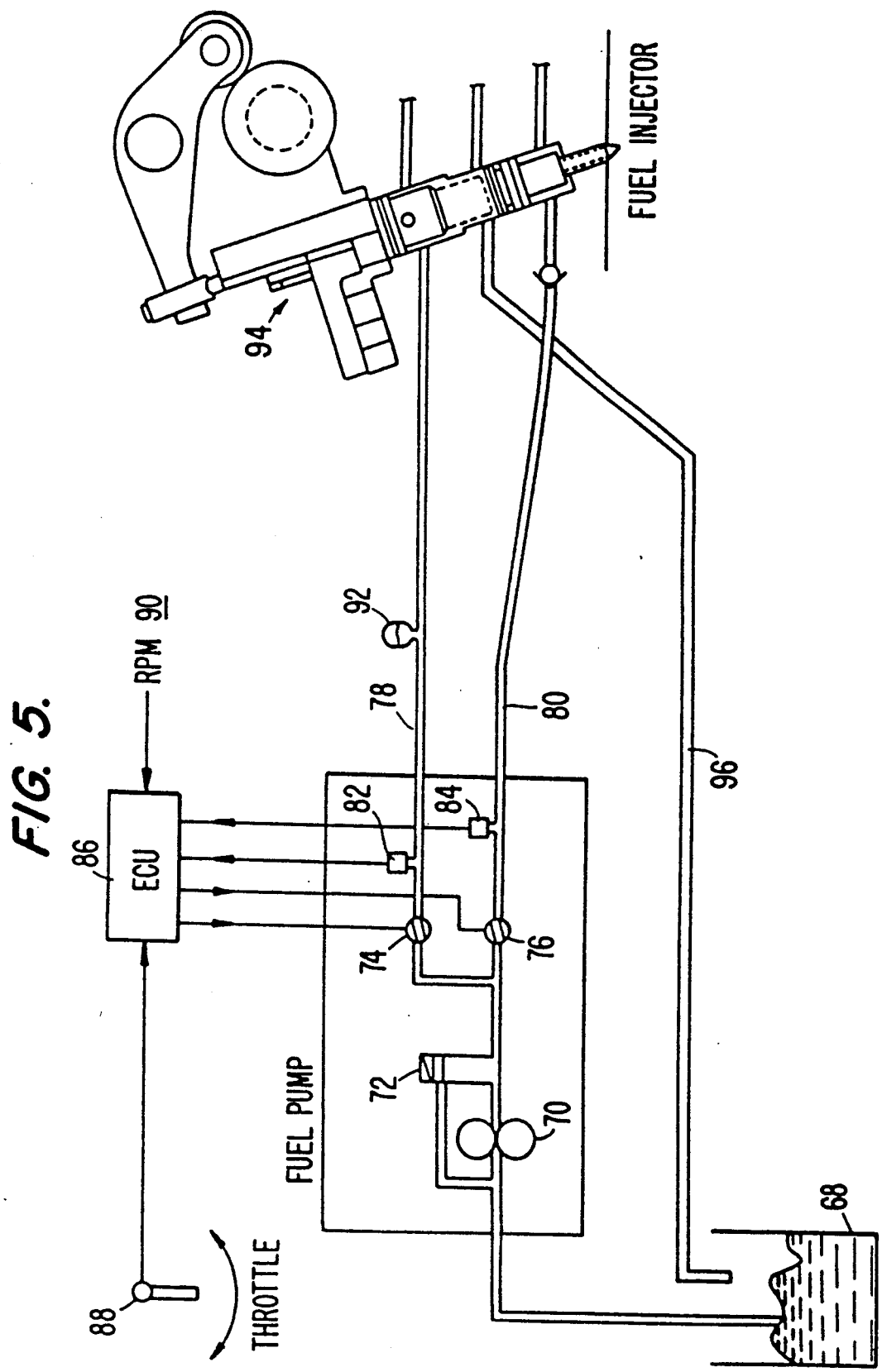
FIG. 5 is a schematic diagram of one embodiment of a fuel supply system according to the present invention.

FIG. 5 illustrates a basic closed loop electronically controlled injector fuel supply system according to the present invention. This embodiment includes a source of fuel 68, and a gear pump 70 with a pressure regulator 72 upstream of two rotary throttle valves 74, 76. Throttle valve 74 is located in the injection timing fluid channel 78, and throttle valve 76 is located in the fueling channel 80. A pressure transducer 82 downstream of throttle valve 74 measures the pressure of the timing fluid/fuel in channel 78, while a similar pressure transducer 84 measures the pressure of the fuel in channel 80. These pressure measurements are transmitted to an electronic control unit 86 (ECU). This electronic control unit, in its most basic form, requires only an engine throttle position 88 signal and an engine speed (RPM) 90 signal as input to control the pressure of the fuel in channels 78 and 80. A look up table (not shown) is included in ECU 86. The desired fuel and timing fluid pressures for specific engine throttle positions and engine speeds are programmed into a look up table so that when the ECU receives pressure information from the pressure transducers 82, 84, this pressure information is compared with the desired pressures for the specific engine throttle position and engine RPM and the ECU transmits signals to the throttle valves 74, 76 to set them accordingly. The position of the throttle valve 74 will control the amount of timing fluid supplied to the injector and, therefore, the pressure of the timing fluid and the advance of timing. Because this system includes a feedback signal indicative of the pressure produced by the control signal, it is referred to as a closed loop control.

Although only a throttle position signal and an engine speed (RPMs) signal are required input to the ECU 86, any additional engine operating parameters, such as temperature, can also be provided to the ECU for more sophisticated control of fueling and timing fluid pressure. Further, other types of electronically controlled valves could be used in place of the rotary throttle valves. For example, solenoid valves, which are pulse width modulated to obtain the desired pressures could replace the rotary valves.

An accumulator 92 is provided in the timing fluid channel 78 to hold excess amounts of timing fluid as needed. The timing fluid channel 78 is connected to a timing fluid passage (not shown) in an injector 94 like the timing fluid passage 38 in injector 10 in FIG. 1. Similarly, the fuel channel 80 is connected to a fuel supply passage (not shown) in injector 94 that is like fuel passage 42 in Figure A fuel return line 96 provides a fluid connection between the injector drain (not shown) and the fuel source 68.

The closed loop system shown and described with reference to FIG. 5 provides the precise and independent pressure control of both fuel and timing fluid desired for optimum functioning of a high pressure injector. However, the use of pressure transducers 82, 84, which must be carefully inspected and usually changed often, could make this system somewhat costly. A less costly system that does not employ pressure transducers is shown in FIG. 6.

Figure 6:
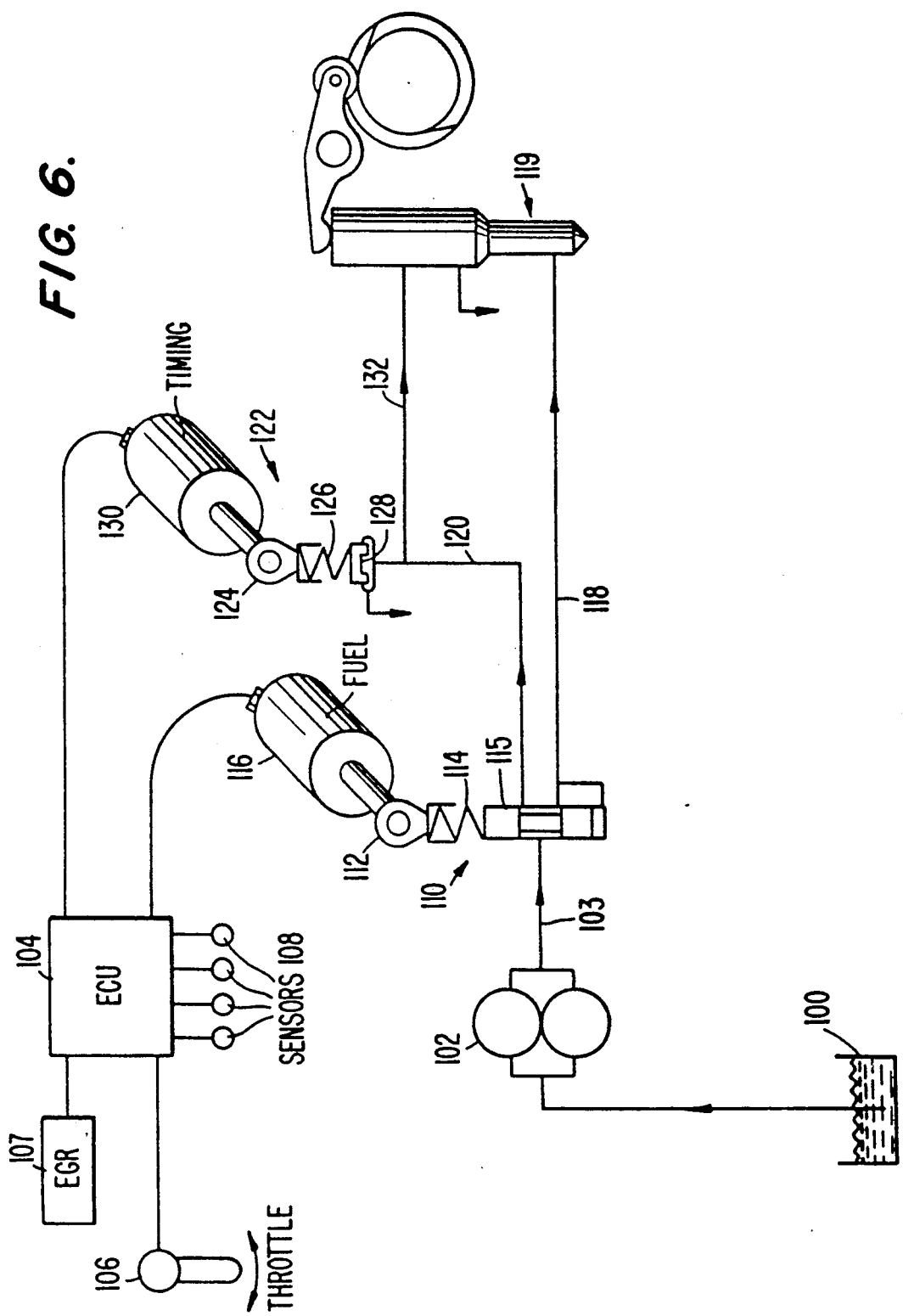
FIG. 6 is a schematic diagram of a second embodiment of a fuel supply system according to the present invention.

The electronically controlled fuel supply system of FIG. 6 also employs a gear pump 102 in an open loop control system which sets fuel channel and timing channel pressures with an electronically actuated pressure controller arrangement. An electronic control unit 104 monitors the position of the engine throttle 106, the output of exhaust gas recirculator (EGR) 107, and the output of a plurality of sensors 108. The sensors 108 monitor engine operating parameters, such as engine speed, temperature, emissions levels and the like, and provide information relating to these parameters to the electronic control unit 104. Electronic control unit 104 processes this information and activates an electronically controlled fuel supply valve 110. Fuel supply valve 110 includes an electronic actuator 112 positioned against a spring 114, which thus creates a known force acting against a plunger (not shown) in a flow divider 115 to achieve the desired pressure for the engine operating conditions. The actuator 112 is driven by a motor 116, which is preferably a stepping motor or a DC motor with position feedback capability that will assure the accuracy of the position of actuator 112.

Fuel is fed to the flow divider 115 under pressure from the gear pump 102 through fuel channel 103. Inside flow divider 115 the fuel flow is divided into two channels: rail 118 and rail 120. The pressure of the fuel in rail 118 is set by the action of the flow divider 115 in response to the relative pressure request in rail 118. Likewise, the pressure of the fuel in rail 120 is set by controller 122 as will be explained in greater detail later. If the pressure request in rail 120 is higher than the pressure request in rail 118, the flow divider 115 will throttle rail 118. If, on the other hand, the pressure request in rail 118 is higher than the pressure request in rail 120, the flow divider 115 will throttle rail 120. The use of the flow divider 115 allows a simpler fuel pump to be used with the type of circuit shown in FIG. 6, in part because the pressure in channel 103 is modulated so that it never exceeds the maximum pressure requested in either rail 118 or rail 120. This differs from other fuel supply circuits that do not employ a flow divider such as 115 in which the pressure in the fuel supply channels and rails will always be the maximum preset value. In this manner the supply of fuel having a pressure which is optimum for the particular engine operating conditions is provided to supply rails 118 and 120.

Rail 118 is a fueling channel and is connected directly to a plurality of high pressure fuel injectors like injector 10 in FIG. 1. Only one such injector, 119, is shown in FIG. 6. Rail 120 is the timing channel that provides timing fluid in the form of fuel to the injectors. The pressure of the fuel in rail 120 is adjusted by an electronically actuated timing pressure controller 122.

The timing pressure controller 122 is similar to the fuel supply valve 110 in that it includes an electronic actuator 124 positioned against a spring 126 to create a known force acting against the area of a plunger counterbore 128, thereby creating a bypass pressure regulator which imparts a known pressure to the timing fluid in rail sections 120 and 132 downstream of the controller 122. Rail section 132 directly supplies timing fluid to the injector 119. A motor 130, which can be a stepping motor, a DC motor with position feedback or the like, drives actuator 124 in a manner which assures that the position of actuator 124 is accurately known. Actuator 124 is set against spring 126 in response to output from ECU 104. The electronic control unit receives input from the throttle 106, EGR 107 and sensors 108 and, thus, is able to process information regarding all relevant engine operating parameters to generate an output signal to timing pressure controller 122. This output signal directs the motor 130 to set the actuator 124 so that it will exert precisely the force required on plunger counterbore 128 to produce the timing fluid pressure in rail section 132 and, ultimately, in injector 119 to create an hydraulic link of the length required to advance timing in accordance with injection requirements. Under high speed engine operation conditions, this timing fluid achieves injector SAC pressures in excess of 30,000 psi.

Figure 7:
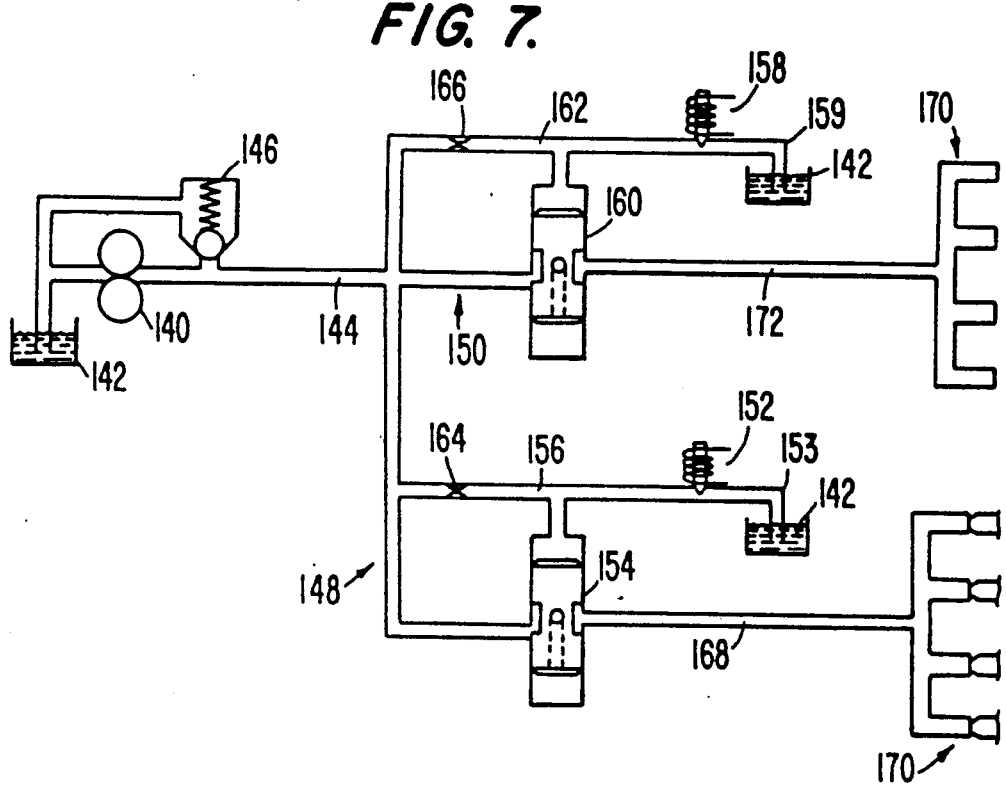
FIG. 7 is a schematic diagram of a third embodiment of a fuel supply system according to the present invention.

FIG. 7 illustrates a third injector fuel and timing fluid supply system embodiment. This embodiment could be employed with either a closed loop system, such as the system shown in FIG. 5, or with an open loop system, such as the system shown in FIG. 6. The system shown in FIG. 7 requires only a minimal amount of electrical energy to operate and, therefore, places less of a load on the electrical system. A gear pump 140 pumps fuel from a reservoir 142 into a fuel supply channel 144. A pressure regulator 146 regulates the pressure of the fuel in supply channel 144 as required before supply channel 144 bifurcates to form a fueling channel 148 and a timing fluid channel 150. In the FIG. 7 embodiment a pulse width modulated solenoid pilot valve 152 is positioned on one side of a servo valve 154 in section 156 of the fueling channel 148, and a similar pulse width modulated solenoid pilot valve 158 is positioned on one side of a servo valve 160 in section 162 of the timing channel 150. Each of the solenoid valves is also connected to a drain line which ultimately provides a fluid connection between the valve and fuel reservoir 142. Drain line 153 allows fluid to flow from solenoid valve 152 to reservoir 142, and drain line 159 allows fluid to flow from solenoid valve 158 to reservoir 142. The fuel in reservoir lines 153 and 159 will have a lower pressure than the fuel in lines 156 and 162. Restricted orifices 164, 166 are positioned in channel sections 156 and 162, respectively, to assist in maintaining the appropriate pressure levels in these lines by restricting the flow of fuel past each of the servo valves.

Although pulse width modulated solenoid valves are shown in FIG. 7, rotary valves or any other similar types of valves that can be electronically controlled could be used as pilot valves in this type of system. The valves 152, 158 are actuated by an output signal from an electronic control unit (not shown) similar to ECUs 86 and 104 in FIGS. 5 and 6, respectively.

Information regarding engine operating conditions is used to provide an output signal to each of the valves 152 and 158 that will actuate each valve to set an appropriate pilot pressure on one side of each of the servo valves 154, 160. The servo valve 154 in fueling channel 148 will then regulate the fuel flow until the pressure of the fuel flowing into fueling channel section 168 is equal to the pilot pressure. The fuel in channel section 168 is then supplied at this pressure to a plurality of injector fuel passages, shown schematically at 170. The pressure of the fuel to be injected, therefore, is precisely controlled by the servo valve 154 in accordance with the pilot pressure set by the solenoid valve 152.

Likewise, the servo valve in timing fluid channel 150 regulates the flow of timing fluid (fuel) into timing fluid channel section 172 so that the pressure of the timing fluid supplied to the injectors, shown schematically at 170, is equal to the pilot pressure set by the solenoid valve 158. As previously discussed, this pressure is set in response to the output of a variety of engine operating conditions supplied to an electronic control unit (not shown) programmed to actuate the pilot valve 158 to set the pilot pressure in accordance with the existing engine conditions. As these conditions change, different information is supplied to the electronic control unit so that an appropriate output signal can be generated to reset the pilot valve to change the pilot pressure as required. The control of the timing fluid pressure, therefore, is infinitely variable in response to engine operating conditions. The pressure of the timing fluid can be infinitely varied in response to engine temperature, emissions levels, fuel pressure and any other operating conditions so that fluid which actually enters the injector has the pressure required to produce and sustain a hydraulic link of a length which will advance timing of the fuel injected. Moreover, since the monitoring of engine operating conditions occurs constantly during engine operation, information required to determine proper timing fluid pressure is constantly processed by the electronic control unit, and signals are constantly being directed to the pilot valve to change the pilot pressure accordingly as required.

As previously noted, the pilot valve/servo valve arrangement could be employed in either an open loop or a closed loop fuel and timing fluid supply system. If an open loop arrangement is used, however, the use of a pulse width modulated solenoid valve as the pilot valve would require more precise control than would the use of such a valve with a closed loop arrangement. The use of a pilot valve/servo valve combination presents additional advantages. Standard gasoline engine electronics may be used on a diesel engine by employing standard gasoline injector valves as pilot valves in place of the solenoid valves shown in FIG. 7. Moreover, since the electronics required for this arrangement are relatively low in cost, the use of a pilot valve/servo valve arrangement to control fuel and timing fluid pressures in a heavy duty engine achieves the precision of control required at a lower cost than other systems available for such engines.

Figure 8:
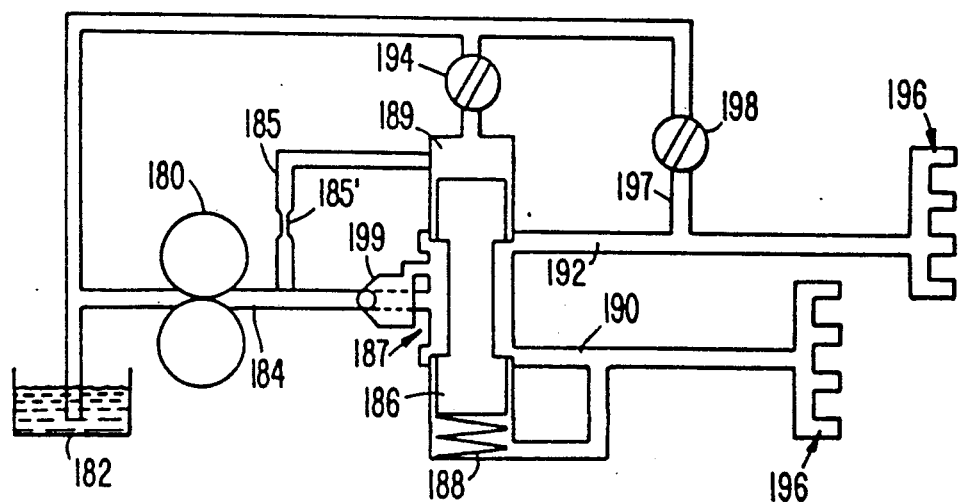
FIG. 8 is a schematic diagram of a fourth embodiment of the present invention.

FIG. 8 illustrates yet another embodiment of a fuel and timing fluid supply system which can be employed with high pressure fuel injectors. In this embodiment, a gear pump 180 draws fuel from a reservoir 182 and directs it through a channel 184 past pressurizing valve 199 to a central groove in the valve element 186 of a spool valve 187. Also gear pump 180 supplies fuel from upstream of pressurizing valve 199 through passage 185 to cavity 189 of valve assembly 187. Orifice 185' permits the pressure in passage 185 to be lower than the passage in channel 184. The spool valve 187 functions in the same manner as flow divider 115 discussed above in connection with FIG. 6. A spring 188 may optionally be included in valve 187 to bias the valve element 186 to a position which blocks the flow of fuel into fueling channel 190 while permitting the flow of timing fuel into timing channel 192. When the spring 188 is omitted, whether the fueling channel or the timing channel is open first will depend on the relative pressures at opposite ends of the valve element 187. An electronically actuated fueling control valve 194 responsive to the output of an electronic control unit (not shown), such as described above in accordance with other embodiments of the present invention, regulates the fuel pressure in cavity 189 which is essentially the same as in fueling channel 190. The pressure of the fuel in channel 190, which is supplied directly to a plurality of injectors, shown schematically at 196, is controlled by control valve 194 in response to various engine operating conditions.

The valve 187 will throttle either fueling channel 190 or timing channel 192 as required depending upon the relative pressure requests in each channel. If the pressure request in channel 190 is higher than the pressure request in channel 192, the valve 187 will throttle channel 192. Conversely, channel 190 will be throttled by valve 187 if the pressure request in channel 192 is higher than the pressure request in channel 190. Further, the pressure in channel 184 will never exceed the maximum pressure request of either channel 190 or channel 192, by more than the setting of pressurizing valve 199 which is typically a low pressure only sufficient to counteract the force of spring 188 if the pressure in both channels 190 and 192 is very low.

An electronically controlled timing control valve 198 is located adjacent to the timing fluid channel 192. The timing control valve 198 bypasses fuel used for timing fluid through branch fuel channel 197 which is connected to timing channel 192 and thus regulates the pressure of the timing fluid in channel 192 in response to the output of an electronic control unit (not shown). As in the embodiments discussed above, the electronic control unit receives information relating to engine operating conditions that would effect the timing of fuel injection. An appropriate control signal is then provided to valve 198, actuating it to make any necessary adjustments in timing fluid flow into channel 196 to insure that the pressure of the timing fluid will create a hydraulic link having a length sufficient to advance timing as required for the engine conditions. It can be seen from FIG. 8 that the flow of fuel into the timing channel 192 will be controlled substantially completely by the timing control valve 198.

Figure 9:
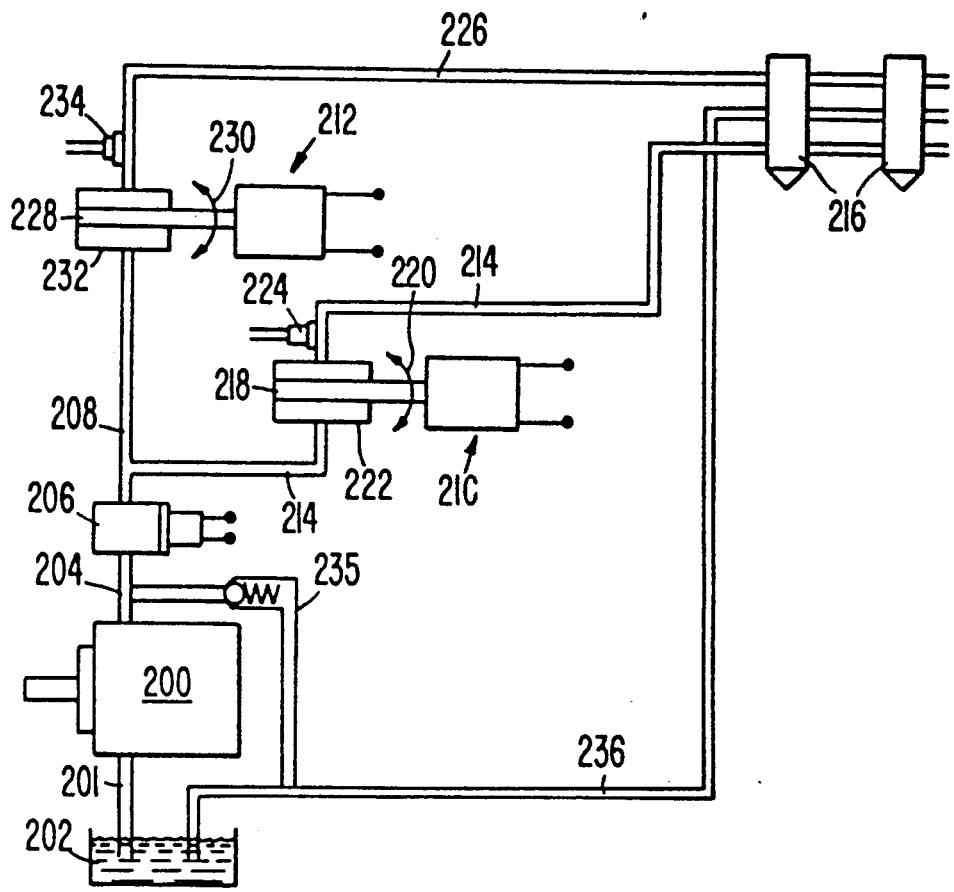
FIG. 9 is a schematic diagram of a fifth embodiment of the present invention.

FIG. 9 illustrates, schematically, an additional embodiment of a fuel supply system which will satisfy the fuel and timing fluid requirements of a high pressure fuel injector such as that shown in FIG. 1. In this embodiment a gear pump 200 draws fuel through a supply channel 201 from a reservoir 202 and pumps it through a conduit 204 to a valve 206, which is preferably a solenoid-type shut down valve. A relief valve 235 prevents damage to pump 200 when valve 206 is closed and also regulates the maximum pressure available in passages 214 and 226. From valve 206, the fuel is directed to a fuel supply passage 208. The shut down valve 206 can be adjusted to stop the flow of fuel to the fuel supply passage 208 if necessary. Otherwise, the fuel supply passage directs fuel to a pair of electronically controlled rotary actuators, such as stepping motors, 210 and 212.

One of the rotary actuators 210 is located in the fuel channel 214 which supplies fuel to be injected to a plurality of injectors 216, only two of which are shown in FIG. 9. The rotary actuator 210, which is the fueling actuator, includes a rotating throttle shaft 218 that rotates in the direction of the arrow 220 to regulate fuel flow through a fuel throttle valve 222. A pressure transducer 224 is located in the fueling channel 214 just downstream of the fuel throttle valve 222. The pressure transducer 224 measures the pressure of the fuel in fuel channel 214 and this information is provided to an electronic control unit (not shown) like those discussed above. The electronic control unit integrates and processes this information with that regarding various engine operating conditions so that the movement of the throttle shaft can be adjusted as required to change the pressure of the fuel flowing through fuel channel or rail 214 to the injectors 216.

The second actuator 212 operates in a like manner to control the pressure of the fuel supplied to the timing channel 226. A throttle shaft 228 rotates in the direction of arrow 230 to control fuel flow from conduit 208 through the throttle valve 232 into timing channel 226. A pressure transducer 234 provides pressure measurements of the fuel in the timing channel to the electronic control unit (not shown), which in turn, regulates the timing actuator 212, thus controlling the amount and concomitantly the pressure of the timing fuel supplied to the injectors 216. A drain line 236 is provided between each of the injectors 216 and the reservoir 202.

Figure 10:
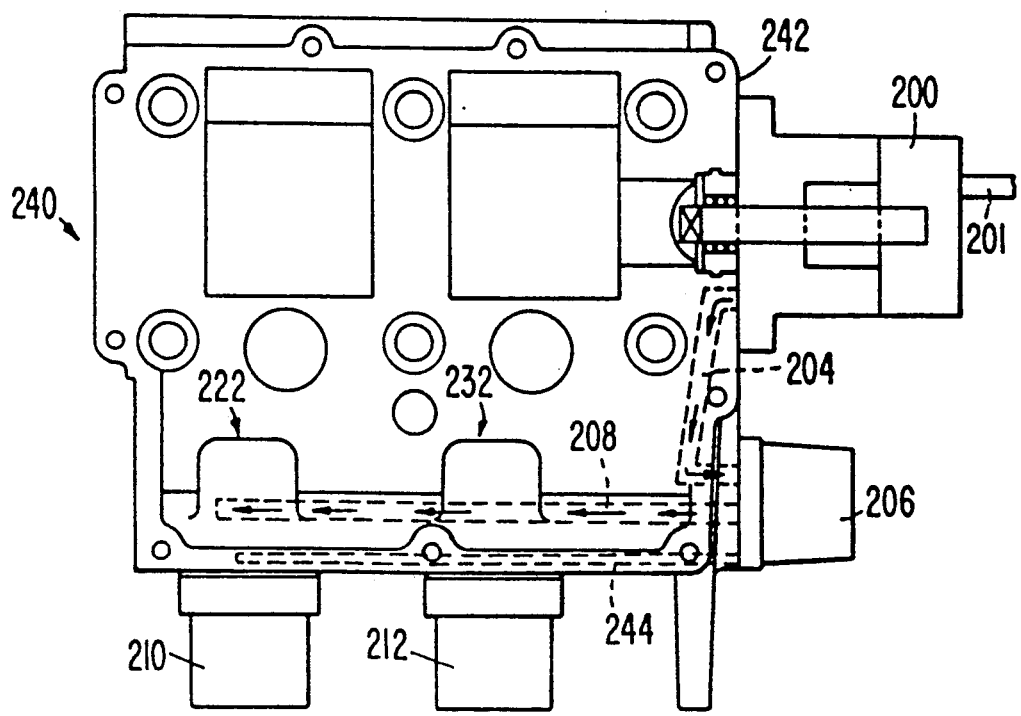
FIG. 10 is a top view of an engine cylinder head showing the fuel supply system of the present invention mounted in place.
Figure 11:
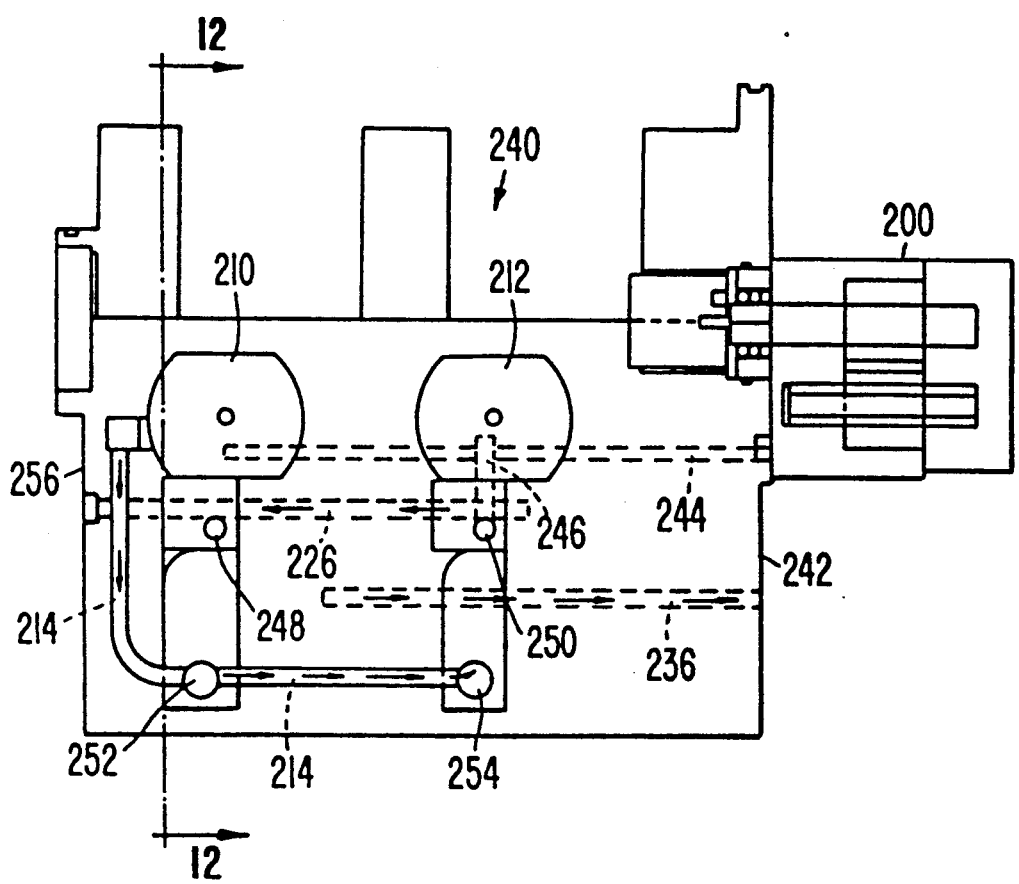
FIG. 11, is a side view of the engine cylinder head of FIG. 10.
Figure 12:
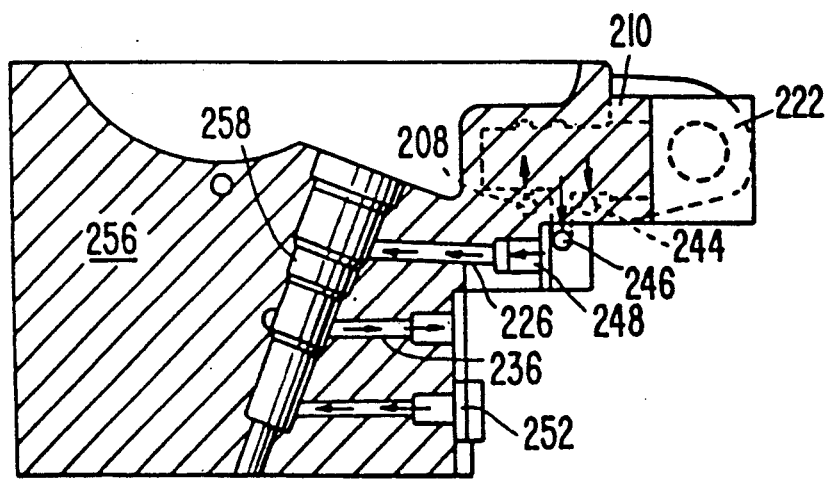
FIG. 12 is a cross-sectional view of an engine cylinder head taken along lines 12—12 of FIG. 11.

Unlike the fuel supply and control systems previously available, the components of the fuel supply and control system described herein are not required to be mounted together in a single unit, but can be mounted separately. For example, the gear pump could be mounted on the rear of the cylinder head where it can be driven directly by an overhead camshaft. Actuators and pressure regulators can be mounted on the side of the cylinder head. This arrangement eliminates the requirement for any fuel plumbing external to the engine head. The only fuel plumbing required for the various embodiments of the present invention is a suction line to the gear pump and a drain line back to the fuel tank. The remaining lines and channels are formed by fuel drillings in the cylinder head and gear pump. FIGS. 10, 11 and 12 illustrate one possible mounting arrangement of the present fuel supply and control system on a two cylinder engine. Although only the mounting for a two cylinder and, hence, a two injector engine is shown and described in detail, a similar mounting arrangement could be employed on an engine having four, six or more cylinders. If the engine has more than two cylinders, this system still requires only two rotary actuators, one to control the fuel pressure and one to control the timing fluid pressure.

FIG. 10 illustrates, in top view, an engine cylinder head 240. The gear pump 200 and shut down valve 206 may be located at one end 242 of the cylinder head 240. The fuel supply conduit 204 containing a pressure relief valve, shown in dashed lines in FIG. 10 directs fuel from the gear pump to the shut-down valve 206 and is formed in the head by internal drillings. Likewise, the fuel supply passage 208, which supplies fuel to the rotary actuator operated valves 222, 232, is formed by a drilling located within the head to provide a fluid connection between the shut down valve 206 and the rotary actuator operated valves 222, 232. A drain line 244 is formed in the head for draining fuel from each of the valves. The direction of fuel flow in this Figure and the remaining Figures is shown by arrows.

FIG. 11 illustrates the cylinder head of FIG. 10 as it would appear viewed from the side. The fueling channel 214 extends from the throttle valve driven by actuator 210 to fuel port 252 for one injector and port 254 for a second injector. The timing channel 226 and the drain line 236 from the injectors, all shown in dashed lines in FIG. 11, are formed by drilling the interior of the cylinder head. Timing fluid is supplied to channel 226 from the throttle valve driven by actuator 212 by means of vertical channel 246. Timing fluid ports 248 and 250 facilitate fluid connection between the timing channel 226 and the corresponding fuel injector bores (FIG. 12). Fuel ports 252 and 254 in like manner facilitate fluid connection between the fuel channel 214 and the injector bores. The fuel exiting channel 236 is returned to the fuel source through lines not illustrated in this Figure.

FIG. 12 illustrates, in cross-sectional view taken along line 12—12 in FIG. 11, the end of the cylinder head 256 opposite the end of the head 242 on which the gear pump 200 is located. A single fuel injector bore 258 and its attendant fuel and timing fluid connections is shown. A substantially identical bore will be provided for each injector. It will be noted from FIG. 12 that the actuator 210 and throttle valve 222 are located adjacent to the injector bore 258. The other actuator 212 will also be adjacent to a cylinder bore (not shown). This is the case because the engine shown has only two injectors. When the present system is installed on an engine with more than two injectors, the two stepping motors and throttle valves required may be positioned adjacent to one of the injector bores or in any other convenient location on the cylinder head upstream of the injector bores.

The foregoing injector fuel supply mounting arrangement allows system components to be positioned on the cylinder head in locations spaced to obtain maximum use of internally drilled fluid channels. The specific configuration discussed is intended to be merely illustrative of one possible mounting arrangement for the present high pressure injector fuel supply system.

INDUSTRIAL APPLICABILITY

The electronically controlled fuel supply system of the present invention will find its primary application in an internal combustion engine employing high pressure fuel injectors wherein SAC pressures in excess of 30,000 psi are achieved. However, the present fuel supply system will also be useful in any internal combustion engine wherein extremely precise control of fueling and injection timing at relatively low cost is a desired objective.

We claim:

1. An electronically controlled fuel supply system for supplying fuel and timing fluid to a plurality of fuel injectors in an internal combustion engine, wherein each of said injectors includes a hydraulic link formed by said timing fluid which cooperates with a serially arranged plunger assembly to pressurize the fuel to be injected wherein said hydraulic link may have a variable effective length in response to variations in pressure of said timing fluid supplied to the said injector, said fuel supply system comprising:
   (a) pump means fluidically connected to a fuel reservoir for pumping fuel from the reservoir to fuel channel means for supplying fuel to the injectors and to timing fluid channel means separate from said fuel channel means for supplying timing fluid to the injectors at a sufficient flow rate and pressure to operate the system;
   (b) valve means fluidically interposed between said pump means and said fuel channel means and said timing fluid channel means for regulating the fuel supply to said fuel channel means and to said timing fluid channel means;
   (c) electronically controlled fuel pressure regulating means fluidically connected to said pump means and to said injectors for regulating the pressure of the fuel to be supplied through said fuel channel means to the injectors for controlling the quantity of fuel to be injected by said injector;
   (d) electronically controlled timing fluid pressure regulating means fluidically separated from said fuel pressure regulating means but fluidically connected to said pump means and to said injectors for regulating the pressure of the timing fluid to be supplied through said timing channel means to the injectors for controlling the quantity of timing fluid supplied to said injector to vary the length of said hydraulic link; and
   (e) electronic control means for receiving and processing information relating to a plurality of engine operating conditions wherein said electronic control means provides a first control signal to said fuel pressure regulating means to actuate said fuel pressure regulating means to adjust the pressure of the fuel supplied to the injectors to control thereby the quantity of fuel injected during each cycle of injection and a second control signal to said timing fluid pressure regulating means to adjust the pressure of the timing fluid supplied to the injectors in response to said engine operating conditions to a pressure sufficient to form a hydraulic link in said injector that will cause the time of injection during each cycle to vary in dependence on engine conditions.

2. The fuel supply system described in claim 1, wherein said valve means includes a spool valve having a first cavity and a second cavity separated from said first cavity by a pressure responsive valve element, and the volume of said first cavity relative to said second cavity is controlled by the movement of said valve element.

3. The fuel supply system described in claim 2, wherein said spool valve further includes a spring means for biasing said valve element to a position wherein the flow of fuel into said fuel channel means is blocked.

4. The fuel supply system described in claim 2, wherein said valve means further includes a pressurizing valve fluidically interposed between said pump means and said spool valve for regulating the pressure of fuel directed into said second cavity.

5. The fuel supply system described in claim 4, further including fuel bypass means for fluidically connecting said first cavity and said pump means, wherein said fuel bypass means includes flow restriction means for restricting the flow of fuel between said first cavity and said pump means.

6. An electronically controlled fuel supply system for supplying fuel and timing fluid to a plurality of fuel injectors located in a plurality of bores formed within the cylinder head of an internal combustion engine, said fuel supply system comprising:
   (a) pump means located at one end of said cylinder head for directing fuel to a fuel supply channel contained entirely internally within said cylinder head;
   (b) electronically controlled fuel pressure regulating means fluidically interposed between said fuel supply channel and an injector fuel rail contained entirely internally within said cylinder head for supplying pressure modulated fuel to said plurality of injectors for controlling the quantity of fuel to be injected by said injector, wherein said injector fuel rail is fluidically connected to each of said plurality of bores;

(c) electronically controlled timing fluid pressure regulating means fluidically separated from said fuel pressure regulating means but fluidically interposed between said fuel supply channel and a timing channel contained entirely internally within said cylinder head for supplying pressure modulated timing fluid to said plurality of injectors for controlling the quantity of said timing fluid supplied to said injectors, wherein said timing channel is fluidically connected to each of said plurality of bores;

(d) valve means fluidically interposed between pump means and said injector fuel rail and said timing channel for regulating the supply of fuel to said fuel rail and said timing channel; and (e) electronic control means for receiving and processing information relating to a plurality of engine operating conditions wherein said electronic control means provides signals to said fuel pressure regulating means to actuate said fuel pressure regulating means to cause said injectors to inject a varying quantity of fuel during each injector cycle depending on engine conditions and provides signals to said timing fluid pressure regulating means to adjust the pressure of the timing fluid in the timing channel to deliver timing fluid to each of said injectors to create a hydraulic link of a length that will cause the time of injection during each cycle to vary in dependence on engine conditions.

7. The fuel supply system described in claim 6, wherein said valve means includes a spool valve having a first cavity and a second cavity separated from said first cavity by a pressure responsive valve element, and the volume of said first cavity relative to said second cavity is controlled by the movement of said valve element.

8. The fuel supply system described in claim 6, wherein said spool valve further includes a spring means for biasing said valve element to a position wherein the flow of fuel into said injector fuel rail means is blocked.

9. The fuel supply system described in claim 6, wherein said valve means further includes a pressurizing valve fluidically interposed between said pump means and said spool valve for regulating the pressure of fuel directed into said second cavity.

10. The fuel supply system described in claim 9, further including fuel bypass means for fluidically connecting said first cavity and said pump means, wherein said fuel bypass means includes flow restriction means for restricting the flow of fuel between said first cavity and said pump means.

11. An electronically controlled fuel supply system for supplying fuel and timing fluid to a plurality of fuel injectors in an internal combustion engine, wherein each of said injectors includes a hydraulic link formed by said timing fluid which cooperates with a serially arranged plunger assembly to pressurize the fuel to be injected wherein said hydraulic link may have a variable effective length in response to variations in pressure of said timing fluid supplied to the said injector, said fuel supply system comprising:

(a) pump means fluidically connected to a fuel reservoir for pumping fuel from the reservoir to fuel channel means for supplying fuel to the injectors and to timing fluid channel means separate from said fuel channel means for supplying timing fluid to the injectors at a sufficient flow rate and pressure to operate the system;

(b) valve means fluidically interposed between said pump means and said fuel channel means and said timing fluid channel means for shutting down the supply of fuel to said plurality of fuel injectors and bypass means for diverting fuel flow around said pump means, thereby preventing damage to said pump means when said fuel supply is shut down;

(c) electronically controlled fuel pressure regulating means fluidically connected to said pump means and to said injectors for regulating the pressure of the fuel to be supplied through said fuel channel means to the injectors for controlling the quantity of fuel to be injected by said injector;

(d) electronically controlled timing fluid pressure regulating means fluidically separated from said fuel pressure regulating means but fluidically connected to said pump means and to said injectors for regulating the pressure of the timing fluid to be supplied through said timing channel means to the injectors for controlling the quantity of timing fluid supplied to said injector to vary the length of said hydraulic link; and (e) electronic control means for receiving and processing information relating to a plurality of engine operating conditions wherein said electronic control means provides a first control signal to said fuel pressure regulating means to actuate said fuel pressure regulating means to adjust the pressure of the fuel supplied to the injectors to control thereby the quantity of fuel injected during each cycle of injection and a second control signal to said timing fluid pressure regulating means to adjust the pressure of the timing fluid supplied to the injectors in response to said engine operating conditions to a pressure sufficient to form a hydraulic link in said injector that will cause the time of injection during each cycle to vary in dependence on engine conditions.

12. The fuel supply system described in claim 11, wherein each of said fuel pressure regulating means and timing fluid pressure regulating means comprises a rotary actuator including a rotating throttle shaft for regulating fuel flow in response to the pressure of the fuel in said fuel channel means and in said timing fluid channel means, wherein said fuel pressure and said timing fluid pressure are sensed by transducer means for sensing fuel pressure located downstream of each said actuators.

13. An electronically controlled fuel supply system for supplying fuel and timing fluid to a plurality of fuel injectors located in a plurality of bores formed within the cylinder head of an internal combustion engine, said fuel supply system comprising:

(a) pump means located at one end of said cylinder head for directing fuel to a fuel supply channel contained entirely internally within said cylinder head;

(b) electronically controlled fuel pressure regulating means fluidically interposed between said fuel supply channel and an injector fuel rail contained entirely internally within said cylinder head for supplying pressure modulated fuel to said plurality of injectors for controlling the quantity of fuel to be injected by said injector, wherein said injector fuel rail is fluidically connected to each of said plurality of bores;

(c) electronically controlled timing fluid pressure regulating means fluidically separated from said fuel pressure regulating means but fluidically interposed between said fuel supply channel and a timing channel contained entirely internally within said cylinder head for supplying pressure modulated timing fluid to said plurality of injectors for controlling the quantity of said timing fluid supplied to said injectors, wherein said timing channel is fluidically connected to each of said plurality of bores;

(d) valve means fluidically interposed between said pump means and said injector fuel rail and said timing channel for shutting down the supply of fuel to said plurality of fuel injectors and bypass means for diverting fuel flow around said pump means, thereby preventing damage to said pump means when said fuel supply is shut down; and (e) electronic control means for receiving and processing information relating to a plurality of engine operating conditions wherein said electronic control means provides signals to said fuel pressure regulating means to actuate said fuel pressure regulating means to cause said injectors to inject a varying quantity of fuel during each injector cycle depending on engine conditions and provides signals to said timing fluid pressure regulating means to adjust the pressure of the timing fluid in the timing channel to deliver timing fluid to each of said injectors to create a hydraulic link of a length that will cause the time of injection during each cycle to vary in dependence on engine conditions.

* * * * *